TIME DIVISION SWITCHING SYSTEM

Filed Aug. 18, 1965

7 Sheets-Sheet 1

INVENTORS H. INOSE
T. SAITO
BY R. C. Winter
ATTORNEY

Aug. 12, 1969 HIROSHI INOSE ET AL 3,461,242

TIME DIVISION SWITCHING SYSTEM

Filed Aug. 18, 1965 7 Sheets-Sheet 2

Aug. 12, 1969 HIROSHI INOSE ET AL 3,461,242

TIME DIVISION SWITCHING SYSTEM

Filed Aug. 18, 1965 7 Sheets-Sheet 3

3,461,242

TIME DIVISION SWITCHING SYSTEM

Hiroshi Inose and Tadao Saito, Tokyo, Japan, assignors to Bell Telephone Laboratories, Incorporated, New York, N.Y., a corporation of New York Filed Aug. 18, 1965, Ser. No. 480,635
Claims priority, application Japan, Feb. 24, 1965, 40/10,202
Int. Cl. H04j 3/02, 3/12
U.S. Cl. 197—15 9 Claims

ABSTRACT OF THE DISCLOSURE

A time division communication system is disclosed in which a plurality of independent control centers each serve a plurality of line concentrators. A connection is completed between two lines associated with different control centers through time slot interchange devices in each control center. This arrangement overcomes blocking in large systems by permitting the two lines to be connected to their associated control centers in different time slots.

This invention relates to communication systems and more particularly to a telephone system operating on a time division multiplex basis.

The current practice in telephone systems is to establish a solid connection between a calling and a called line via a path which is associated individually and uninterruptedly with the connection for the duration of the call. Thus a quantity of equipment, dependent upon the number of lines served and the expected frequency of service, is provided in a common pool from which portions may be chosen and assigned to a particular call. Such a system arrangement is referred to as "space division" in which privacy of conversation is assured by the division or separation of individual conversations in space.

In contrast, telephone systems have been developed which operate on a time division basis in which a number of conversations share a single path. Privacy of conversations is assured in such systems by separation of individual conversations in time, i.e., a number of conversations share a common transmission facility by dividing the total available time of the facility equally among them. Thus each call is assigned to the common path for an extremely short but rapidly and periodically recurring interval, and the connection between any two lines in communication is completed only during these short intervals or time slots. Samples which retain essential characteristics of the voice or other signal are transmitted in these time slots and are utilized in the called line to reconstruct the original signal. Reception of signals of any complexity through such a time division network is entirely satisfactory.

It is necessary that such a time division system identify and remember which lines have been assigned which time slots in the recurring cycle so that active lines will always be sampled at the proper time. Such operations may be synchronous in which case the same time slot is assigned to the calling and called lines. A system employing such synchronous operation is described in D. B. James et al. Patent 2,957,949, issued Oct. 25, 1960. This type of operation is entirely satisfactory from a traffic standpoint in systems which include a single control facility common to all subscriber lines. However, a blocking problem is introduced when the system is expanded to include geographically remote groups of subscriber lines for which individual switching and control facilities are provided to concentrate the lines for connection to a control center or central office. All of the facilities, at a remote location and in the control center, are referred to collectively as a concentrator; that equipment in the remote area is known as the remote concentrator, while the associated equipment in the control center is referred to as the concentrator controller.

To illustrate the blocking problem in such a multiconcentrator system, consider that a party associated with a first concentrator places a call to a party in a second concentrator. A specific number of time slots are available in each concentrator for assignment to call connections in accordance with the particular traffic requirements. In a synchronous operation, as indicated, a connection is completed only when the same time slot is available in both of the concentrators concerned. Consider, for example, that the first time slot in the cycle of available time slots is idle in the first concentrator. Thus it may be assigned to the calling line. However, in attempting to complete a connection through the second concentrator to the called line, it is found that the first time slot in the cycle is being utilized on another call in that concentrator. Thus, the instant connection is blocked from utilizing the first time slot, and a delay is encountered while a common idle time slot is being determined.

This problem is further aggravated as additional switching stages, through which the connection must be established, are added to the system; e.g., a second group of remote concentrators linked by a second control center is made available to the first group via trunks between the two control centers. In this instance, the chances of the same time slot being idle simultaneously in the originating and terminating concentrators as well as in the intermediate switching stages are slight, and the possibility that complete blocking and loss of the call will occur is increased.

The probability that blocking will occur in time division switching systems involving a single control center is substantially reduced by means of an arrangement described in H. Inose et al. Patent 3,172,956, issued Mar. 9, 1965. In accordance with this disclosure, information provided in the time slot assigned to the calling line is delayed en route so as to be transmitted to the called line in a different time slot. Thus if a common time slot is not available the call is not lost. Instead, a different time slot, which is idle in the concentrator terminating the called line, is assigned to the called line, and information is transferred between the two time slots prior to transmission to the respective parties. Such an arrangement is termed time slot interchange.

Of course, in a telephone system, the loss of any calls due to the inability of the physical plant to accommodate them under traffic conditions for which the system was designed is unacceptable. Arrangements disclosed in H. Inose et al. patent application Ser. No. 461,791, filed June 7, 1965, overcome blocking in systems involving a single control center, and the instant disclosure provides the optimum solution to the problem in systems including more than one control center.

Therefore, it is a general object of this invention to provide an improved time division multiplex communication system.

It is another object of this invention to provide a time division telephone system in which the traffic handling capacity may be improved without increasing the number of available time slots. More specifically, it is an object of this invention to reduce the blocking problem in time division switching systems including more than one control center so that it will always be possible to establish a connection from an idle inlet to an idle outlet regardless of the amount of traffic present in the system.

These and other objects of the invention are attained in one specific illustrative embodiment wherein a time division telephone system comprises distinct groups of telephone lines remote from one another and connected through corresponding line concentrators to a control center. A number of interconnected control centers of this type comprise the system. The telephones associated w'th each concentrator are controlled on a time division multiplex basis such that the various concentrators are each connected to the corresponding control center via a corresponding transmission channel. Each concentrator has available a fixed number of time slots for assignment to lines which it terminates.

When a party associated with a first control center places a call to a party associated with a second control center, a time slot idle in the originating concentrator is assigned initially to the calling line. The system then locates a connecting link between the two control centers which is idle in the assigned time slot. Such connecting links, which are also available for intraoffice connections, are designated as junctor networks. The junctor network consists of a plurality of crosspoint switches, each crosspoint providing a connection between the send lead of a transmission channel from one remote concentrator or control center and the receive lead of a transmission channel to the same or another remote concentrator or another control center. Thus, each complete connection through the system involves at least two junctor crosspoints for each direction of transmission.

The status of the called line is next determined, and if it is idle, the availability of an idle time slot in the concentrator terminating the called line is investigated. If a time slot is idle in the terminating concentrator and in a junctor switch linking the control centers, it is assigned to this call connection and the connection is completed.

If the first junctor crosspoint connecting the originating concentrator to the interoffice link does not have a common idle time slot therebetween, and thus is not available to accommodate the instant call, the originating control center will test other junctor crosspoints until such a common idle time slot is discovered. Similar action is taken independently in the terminating control center. This is a purely random selection and bears no relationship to the time slot assigned in the originating control center.

Upon locating such common idle time slots in the two control centers, the identity of both time slots is registered and transmitted to switching circuitry at appropriate times so as to complete the connection to the originating concentrator in one time slot and to the terminating concentrator in the other time slot. In this fashion a transposition of time slots between control centers is accomplished, thus obviating the time slot blocking problem prevalent in systems in which the same time slot must be assigned to a call connected through a plurality of control centers.

The actual time slot transposition is effected by a pulse shifting device such as a tapped delay line, as disclosed in the aforementioned Inose et al. patent. The taps are placed at points corresponding to the duration of each time slot in the cycle of time slots. Each tap is connected to a distinct gate. A translating device, receiving time slot designations from the control center, selectively controls the operation of these gates. The information regarding called line designations and assigned time slots is transferred between control centers via data links. Thus, all information received in the time slot assigned to the calling line is automatically transferred to the time slot assigned to the called line, and the connection is completed in the latter time slot. The inverse transposition is effected for information transmitted in the opposite direction.

According to one aspect of the invention, optimum performance is realized on interoffice calls by placing a pulse shifter between the input crosspoints of each junctor switch in the other control center. Such an arrangement provides the desired independence in time slot assignment between the two control centers as well as maximum efficiency in crosspoint utilization.

According to another aspect of the invention, the pulse shifters and junctor crosspoints are controlled in pairs in each control center. This permits a sizeable reduction in amount and complexity of control equipment required and is made feasible by the unique arrangement of the network to facilitate interoffice calls.

It is a feature of this invention that time slot interchange devices be associated with junctor networks in a time division switching system including more than one control center in such a manner that blocking is reduced to an optimum level.

It is a feature according to one aspect of the invention that the control center through which a call is originated independently assign the time slots and junctor crosspoints required to establish that portion of the call connection involving the calling line, that the terminating control center independently assign the time slots and junctor crosspoints required to establish that portion of the call connection involving the called line, and that data links convey the assignment information between the control centers.

It is another feature according to this aspect of the invention that call connections be established between control centers via a junctor crosspoint in each control center and a time slot interchange device intermediate each pair of junctor crosspoints.

It is a feature in accordance with another aspect of this invention that each pair of junctor crosspoints serving a given concentrator, including one crosspoint in the input junctor network and one crosspoint in the output junctor network, be enabled in common.

It is another feature in accordance with this aspect of the invention that a pair of time slot interchange devices serving a given concentrator be controlled in common.

More particularly it is a feature in accordance with this aspect of the invention that the pair of time slot interchange devices be of distinct types, each receiving identical control signals and providing output signals in distinct time slots.

A complete understanding of this invention and of these and various other features may be gained from consideration of the following detailed description and the accompanying drawings, in which.

Figure 1:
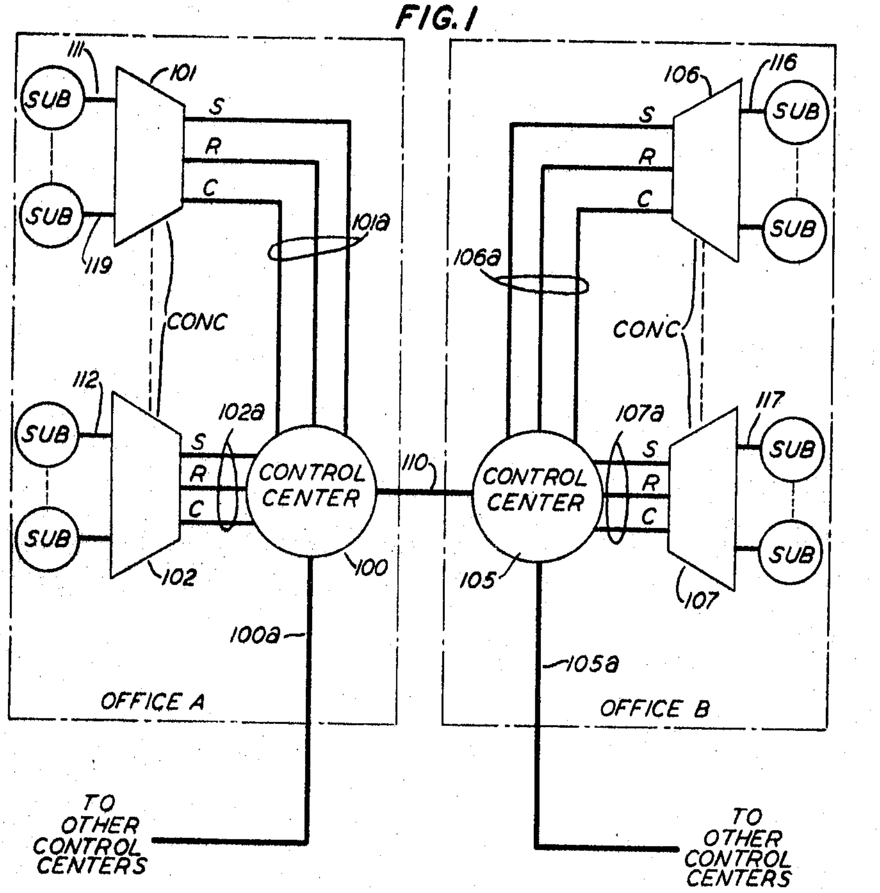
FIG. 1 is a block diagram representation of a telephone system comprising two distinct groups of remote telephone line concentrators, each group terminating at a corresponding one of a pair of interconnected control centers.
Figure 3:
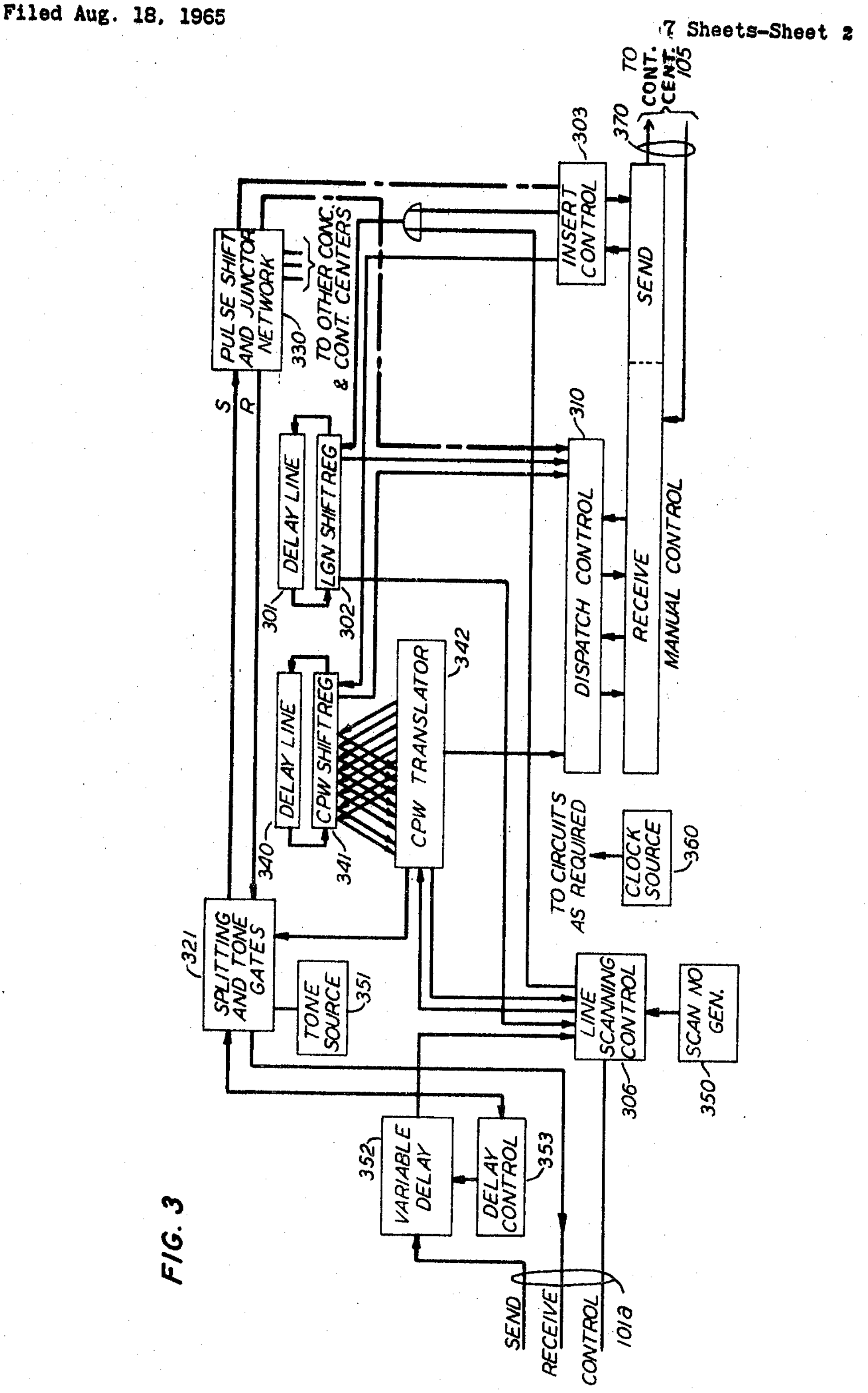
FIG. 3 is a representation in block diagram form of a control center as depicted in FIG. 1.
Figure 4:
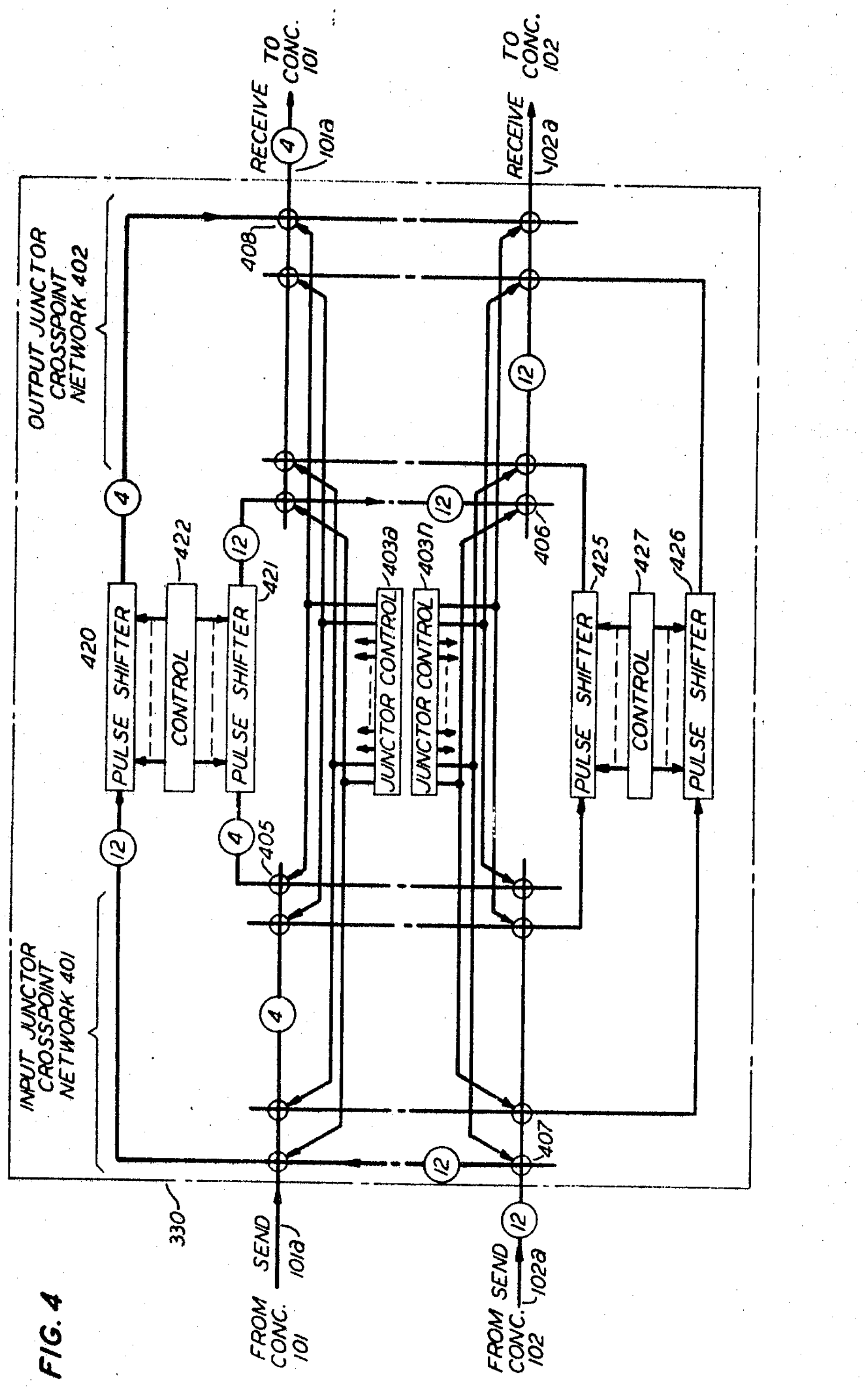
FIG. 4 is a block diagram representation in greater detail of the components contained in the pulse shift and junctor network depicted in FIG. 3.
Figure 6:
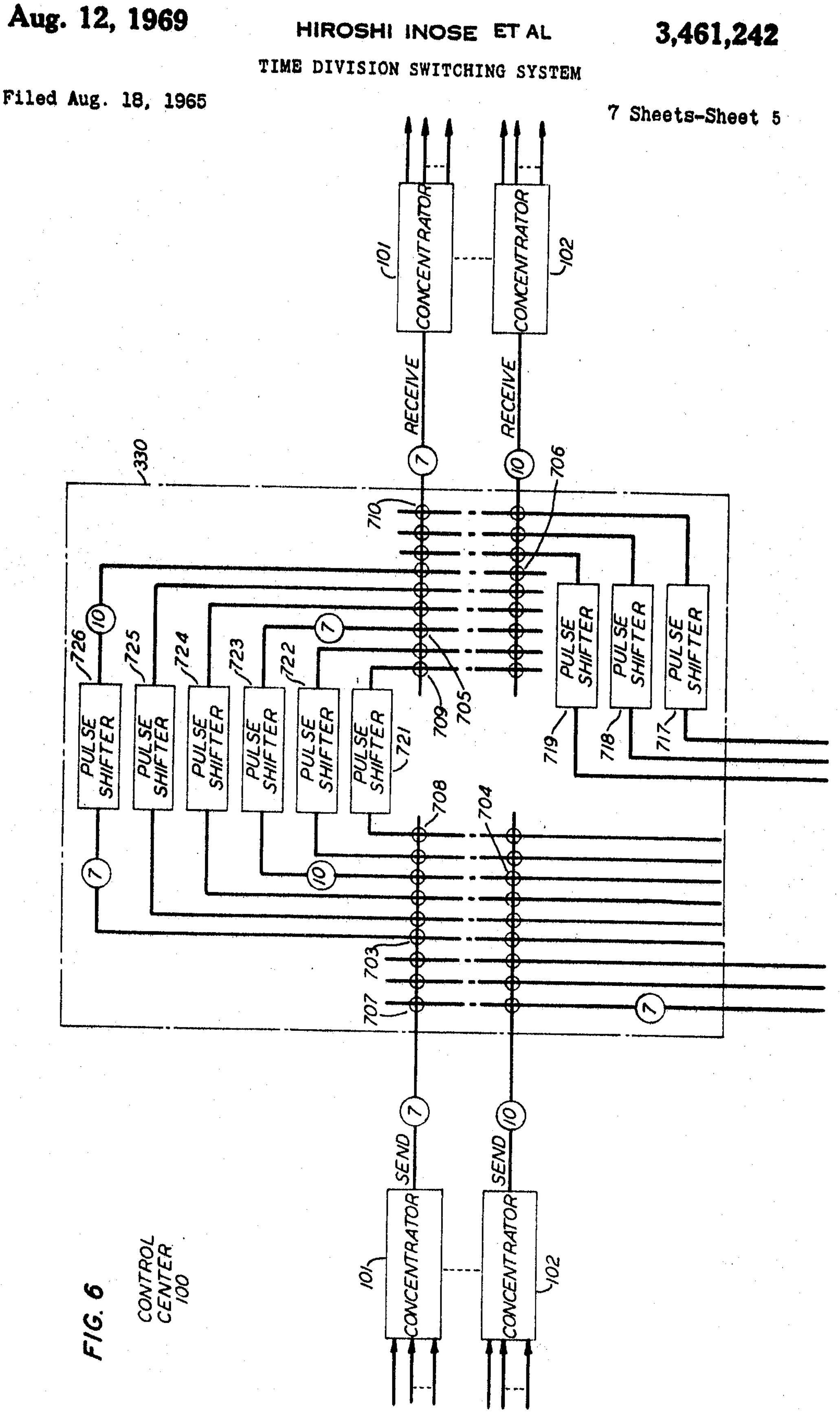
Figure 7:
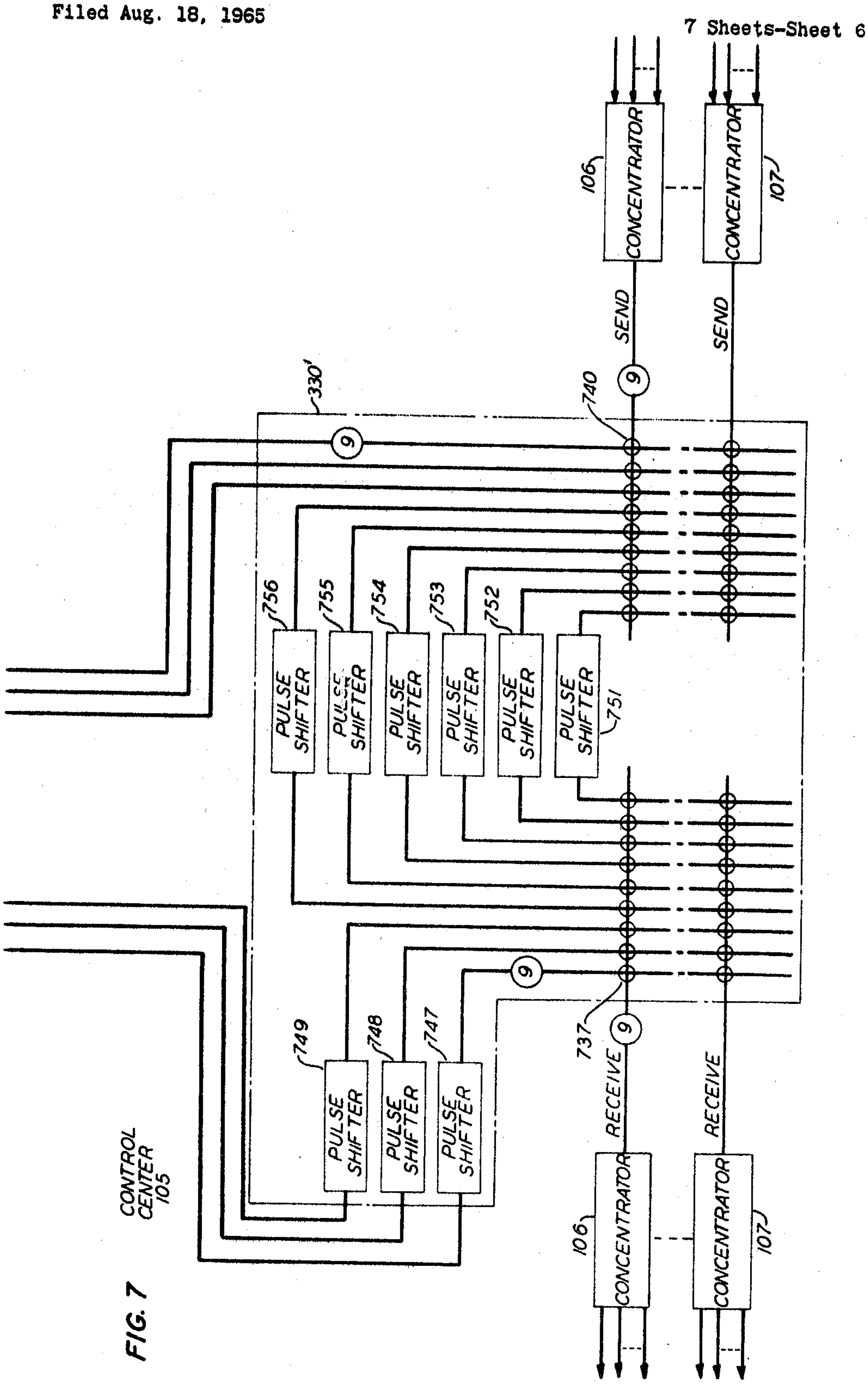
Figure 8:
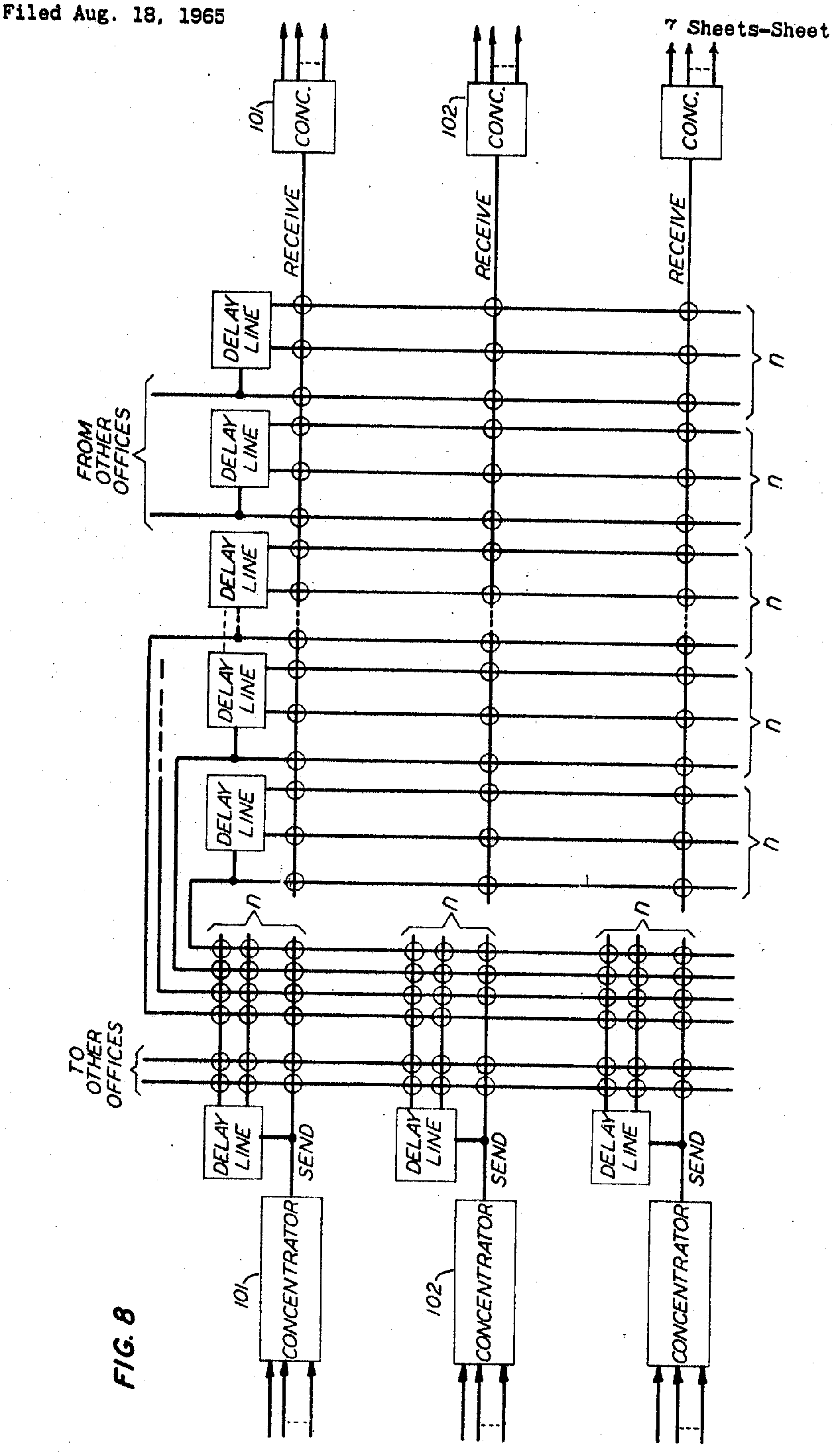

FIGS. 6 and 7 contain a representation in block diagram form of the pulse shift and junctor network components of two control centers and illustrating the interconnection of these components between the two control centers depicted in FIG. 1; and FIG. 8 is a representation of the components contained in the pulse shift and junctor network depicted in FIG. 3 which illustrates an alternative arrangement to that depicted in FIG. 4.

Figure 2:
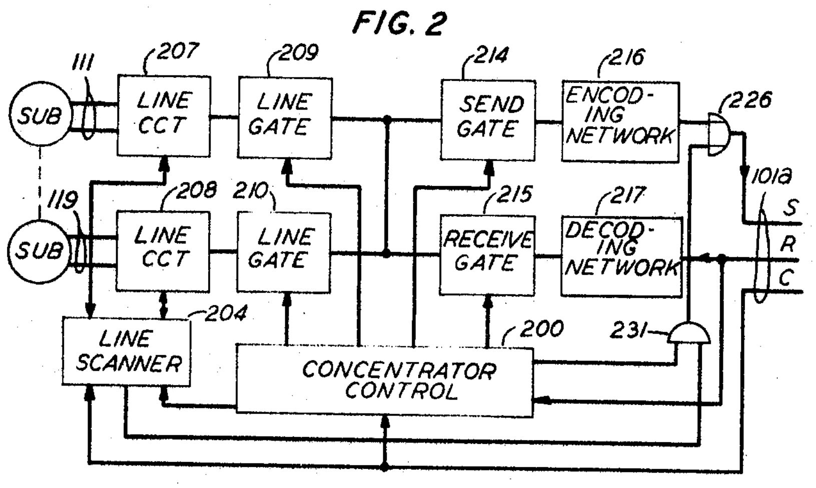
FIG. 2 is a representation in block diagram form of the concentrator switching and control portion of the telephone system in FIG. 1.

Turning now to the drawing, the telephone system depicted in FIGS. 1–3 is similar to that disclosed in the aforementioned James et al. patent which will be described in general terms hereinafter to provide a basis for the detailed description of the improvements realized in accordance with our invention and depicted in FIGS. 4 through 8.

In FIG. 1 the telephone system comprises a group of remote telephone line concentrators including 101 and 102, each connected via coresponding transmission channels such as 101*a* and 102*a* to the control center 100. A second group of concentrators including 106 and 107 is connected to a second control center 105 by corresponding transmission channels such as 106*a* and 107*a*. The control centers 100 and 105 are interconnected by interoffice trunks 110 and are connected to other control centers by corresponding trunks 100*a* and 105*a*.

The remote concentrators are so named because of the connection thereto of a plurality of individual telephone subscriber lines concentrated in the same remote area, such as lines 111, 119 connected to concentrator 101. Each interconcentrator or intraconcentrator connection, as well as connections between a concentrator and a foreign office, is completed through the corresponding control center via the appropriate transmission channel on a time division basis. For purposes of this description, a telephone office comprises a control center and its associated remote concentrators. Thus FIG. 1 depicts office A and office B with interoffice trunks 110 and trunks to other offices 100*a* and 105*a*.

The control center assigns to a calling line a particular time slot in a recurring cycle of time slots during which time information is transferred to and from the calling and called lines via the appropriate transmission channels. Similarly, other call connections are assigned distinct time slots in the recurrent cycle of time slots such that the various channels are shared in time by the active telephone calls and a considerable saving in cable is the beneficial result.

Operation of the telephone system on a synchronous basis, as described in the aforementioned James et al. system, presupposes that each pair of lines in communication exchanges information in the same time slot, with bilateral transmission of the information being implemented by the appropriate transmission channels. Each concentrator operates in the same office cycle of time slots but assigns time slots to active lines without concern for such assignments in other concentrators. Thus a first time slot in concentrator 101 occurs simultaneously with time slot 1 in all of the other concentrators in office A but a line in concentrator 102 may be utilizing this time slot on one call while a line in concentrator 101 is utilizing it on a different call.

Consider, now, that telephone line 111 desires to place a call to telephone line 112. Control center 100 upon detection of the request for service assigns an idle time slot in concentrator 101 to line 111 and then proceeds to determine the condition of that time slot in concentrator 102. If it is idle, the connection between lines 111 and 112 is completed in that time slot. It is apparent, however, that this particular time slot may be busy on another call in concentrator 102, such that the control center 100 must search through its memory in order to find a common idle time slot in both concentrators 101 and 102. Upon determination of such an idle time slot, appropriate switches are actuated in both concentrators during this time slot to complete a connection between calling and called lines once per office cycle for the duration of the call.

It is possible that in conducting this search the control center will find that no common idle time slot is available, in which case the instant call is blocked. This problem is further aggravated by additional switching stages through which the call connection must be completed such as would be the case if the calling line were attempting to place a call to a line in office B, thereby adding the switching stage present in control center 105.

Considerable improvement may be realized in such a system through the adoption of a scheme referred to herein as time slot transposition, which scheme substantially eliminates the difficulties arising from the same time slot per call arrangement of James et al. The basic time slot transposition arrangement, as disclosed in the aforementioned Inose et al. patent, assigns a different time slot to the called line if a common idle time slot cannot be located. Information received from the calling line in the time slot assigned thereto is then transposed in the control center to the time slot assigned to the called line prior to its transmission to the concentrator serving the called line. A similar transposition occurs in the reverse direction. The particular equipment required for this transposition is depicted in FIGS. 4–8 and will be described in conjunction with the description of the system arrangement in accordance with this invention.

The remote concentrator 101 equipment depicted in FIG. 2 is duplicated in each remote concentrator in the system. Similarly, the equipment in that portion of control center 100 serving concentrator 101, as depicted in FIG. 3, is duplicated in the control center for each concentrator in office A. FIGS. 2 and 3 correspond to FIGS. 2 and 3 of the above-identified James et al. patent.

Each telephone line associated with remote concentrator 101, as shown in FIG. 2, is connected to the concentrator switching network via two wire talking paths. Thus subscriber line 111 is connected through a conventional line circuit 207 to line gate 209, the latter being connected in turn to send and receive gates 214 and 215, respectively, of the transmission channel 101*a*. The line gates connected to active lines are enabled in distinct selected time intervals or time slots of a repetitive cycle of time slots, and the send and receive gates in the common bus are enabled consecutively during each time slot. These gate operations are controlled by circuits located in the remote concentrator control 200. The remote concentrator control 200 in turn receives directive signals via the R and C leads of the transmission channel 101*a*.

In order to establish a connection between two lines, the system first detects a request for service through a continual scanning process involving line scanner 204 in which the condition of each line in the remote concentrator is observed periodically in a supervisory time slot of the recurrent cycle. The request for service or off-hook condition is reported through the line scanner 204, AND gate 231, OR gate 226, the send lead of the transmission channel 101*a* and variable delay 352 to the line scanning control 306 (FIG. 3).

Upon verification of this request for service, the control center (FIG. 3) stores the designation of the calling line in a particular time slot. Immediately preceding this time slot in each recurrent cycle thereafter, this number will be transmitted via the control lead of channel 101*a* to the remote concentrator control 200 which in turn translates the coded number and activates the particular line gate associated with the calling line during the selected time slot.

Concurrently with the operation of a line gate, the send gate 214 in the transmission channel 101*a* is enabled so as to transfer information from the calling line through encoding network 216 to the send lead of the transmission channel. Subsequently, in the same time slot, the receive gate 215 is enabled while the send gate 214 is disabled, thereby permitting transfer of information from the receive lead of the transmission channel through decoding network 217 to the calling line. In this fashion bilateral transfer of information between an active line and the common transmission channel is completed in the particular time slot assigned to the active line. A more detailed description of the operation involved in the remote concentrator is contained in the aforementioned James et al. patent.

In order to further assist in an understanding of the particular timing involved in this system, it would be advisable to consider a specific system timing arrangement. Thus consider that the repetitive cycle of time slots, referred to as a "frame," consists of 24 time slots, each time slot having a duration of 5.2 microseconds. The various gates in the system are controlled by precisely timed signal pulses so as to transfer information between calling and called subscribers in the preassigned time slots. Eight binary digits or bits of information comprise a word which may be transmitted in each time slot. Thus, with 24 time slots, 192 bits of information may be transferred per frame period. Timing within a frame is established by a common clock pulse source 360, FIG. 3, serving all concentrators and all control center equipment, as described in greater detail in the aforementioned James et al. patent application. This source provides pulse signals to distinct bit, word and frame conductors as required.

In each of the first 23 time slots of a frame, certain distinct designations must be maintained in the control equipment of FIG. 3 concerning the call being served. These designations are the line or trunk gate numbers, the junctor crosspoint numbers, the call progress word and the tape gate numbers. The information handled in the 24th time slot concerns establishment of the call and is not assigned to any particular call. The information words are stored in distinct circulating memories, each of which includes a delay line and a short shift register, the total loop delay being equivalent to the frame interval; i.e., 24 time slots of 8 bits duration, or a total of 192 bit periods.

The circulating memory for the line gate number comprises the delay line 301 and the shift register 302. Line gate numbers for the first 23 time slots may be inserted in this memory loop under the control of the insert control 303. Line gate numbers may also be inserted in the line gate number shift register 302 by the line scanning control 306. Line gate numbers are read out of the shift register 302 and transmitted to the remote concentrator over the control lead of the transmission channel 101*a* through the line scanning control 306. This line gate number information is utilized by control equipment in the remote concentrator to enable the particular line gate corresponding to the line gate number so as to connect the associated line to the transmission channel for transfer of information during the assigned time slot. This line gate number is also transmitted to the dispatch control 310 where it is available to the receive portion of the manual control.

The control center further comprises a switching network designated the pulse shift and junctor network 330. A connection between calling and called lines is completed by operation of appropriate crosspoints or gates in this network, designated junctor crosspoints, for each direction of transmission. As will be apparent from the description of FIGS. 4–8 hereinafter, a pair of junctor crosspoints in network 330 is operated to complete the connection from a calling party in one concentrator to a called party in the same or another concentrator, which other concentrator may be located in the same or another office. In the latter instance an interoffice junctor is involved in which one crosspoint is located in the originating office and the other crosspoint of the junctor pair is located in the terminating office. Another junctor crosspoint pair is operated to complete a transmission path from the called party to the calling party.

The connections are completed in both directions through time slot interchange devices or pulse shifters which, in accordance with this embodiment, are located between each pair of junctor crosspoints as illustrated in FIGS. 4, 6, 7 and 8.

Control of the pulse shifters and junctor crosspoints is exercised by tap gate numbers and junctor crosspoint numbers, respectively, contained in circulating memories which receive orders from the insert control 303 and transmit information to the dispatch control 310. Data links such as 370 convey information between control centers essential to the establishment of interoffice calls such as the status of called lines and designations of time slots and junctor crosspoints available for assignment to such interoffice call connections.

It is apparent that the myriad of switching operations taking place in this system in precisely timed intervals requires that the progress in the establishment and maintenance of a call be followed by additional control equipment. The call progress word is the designation accorded the current status of a call for the benefit of all other elements in the common control. Call progress words are stored in a final circulating memory comprising delay line 340 and call progress word shift register 341. At selected intervals the current call progress word relating to a particular call is utilized to control various other switching and control elements. Upon the change in the status of a call, a new call progress word will replace that recorded in the circulating memory relating to a particular call. A more complete description of the composition and operation of corresponding circulating memories and translators may be found in the aforementioned James et al. patent.

In summary, four information words; viz., line gate number, junctor crosspoint number, tap gate number and call progress word, are circulated in individual memories. The line gate numbers control the operation of the individual line gates at the remote concentrators to effect connection of the subscriber lines to the common transmission bus. The junctor crosspoint numbers are transmitted at the appropriate times to effect control of the junctor crosspoints in accordance with the desired transmission channel interconnections. The tap gate numbers are translated at the appropriate times to operate tap gates connected to various pulse shifters in the network 330 so as to implement the time slot interchange directly concerned with the instant invention. The call progress word reflects the state of each call to the various control components.

Other components indicated in FIG. 3 are described only in brief hereinafter inasmuch as they are not directly concerned in the operation of the system with respect to the instant invention and are completely described in the aforementioned James et al. patent. The line scanning control 306 and the scan number generator 350, in conjunction with other control equipment in the common control, serve to observe the condition of each subscriber line connected to the remote concentrator 101 and to detect and record in the 24th time slot an indication of the condition of each of the subscriber lines as they are scanned in sequence. The system transmits information over the transmission channels and through the common control in pulse code form, and the splitting and tone gate circuit 321 provides means for sending coded supervisory tones from tone source 351 to a remote concentrator without having to engage junctor crosspoints or tap gates; tone source 351 may be of the type disclosed in H. E. Vaughan Patent 3,050,589, issued Aug. 21, 1962. It is apparent that a variable time delay results during transmission of the signal from a remote concentrator to the common control and between the various offices. In order to compensate for this transmission delay, the variable delay 352 and the delay servo 353 serve to adjust the length of delay to be exactly one frame interval, such that the common control receives the information in the same time slot in which it was transmitted from the remote concentrator or other office except that it is one frame interval later; the delay servo 353 may be of the type shown in W. A. Malthaner Patent 2,960,571, issued Nov. 15, 1960.

One important aspect of the invention is depicted in FIG. 4. As noted therein, the pulse shift and junctor network 330 comprises an input junctor crosspoint network 401, an output junctor crosspoint network 402 and a pulse shifter, such as 420, connected between each pair of crosspoints in the two networks. Each of a plurality of junctor control circuits 403*a*–403*n* controls all of the junctor crosspoints serving a corresponding concentrator. Thus junctor control circuit 403*a* operates input and output junctor crosspoints connected respectively to the send and receive leads of the transmission channel associated with concentrator 101. Similarly, junctor control 403*n* operates crosspoints connected to the transmission channel associated with concentrator 102.

This manner of junctor control recognizes and takes advantage of the fact that each interconcentrator call and each interoffice call requires a pair of junctor crosspoints, one input crosspoint and one output crosspoint, operating in the same time slot for each concentrator involved in the call. This may be seen in following an interconcentrator call in FIG. 4. Consider, for example, that a calling line terminates on concentrator 101, the called line terminates on concentrator 102 and a time slot transposition is required. Typical connections for processing this call may be the following: coded speech signals from the calling line are transmitted in time slot 4, indicated by the circled number, through the send lead of channel 101*a* and the input junctor crosspoint 405 to pulse shifter 421. The signal is shifted to time slot 12 and proceeds through output junctor crosspoint 406, and the receive lead of channel 102*a* to the called line at concentrator 102. Similarly, coded speech signals from the called line are transmitted in time slot 12 through the send lead of channel 102*a* and the input junctor crosspoint 407, to pulse shifter 420. The signal is shifted to time slot 4 and proceeds through output junctor crosspoint 408 and the receive lead of channel 101*a* to the calling line at concentrator 101.

It may be noted that in this switching sequence crosspoints 405 and 408 were both enabled in time slot 4, while crosspoints 406 and 407 were both enabled in time slot 12. This requirement is capitalized in accordance with this aspect of the invention by combining the control of input and output junctor crosspoints for each concentrator in a single control circuit. The junctor control comprises a circulating memory containing crosspoint designations for each time slot. In a given time slot the current content of a shift register in the circulating memory is translated and applied to a control lead connected to the designated crosspoints.

In accordance with this aspect of the invention, a single junctor control circuit serves all of the crosspoints corresponding to a single concentrator. Recognizing that for each interconcentrator or interoffice call a pair of crosspoints associated with the originating or terminating concentrator operates simultaneously, each control lead is connected in multiple to the corresponding pair of crosspoints to be enabled simultaneously. Thus in the foregoing example junctor control 403*a* will provide an enabling signal simultaneously to crosspoints 405 and 408 in time slot 4. Similarly, junctor control 403*n* provides an enabling signal simultaneously to crosspoints 406 and 407 in time slot 12. This arrangement reduces the number of junctor control circuits required in the system by one per concentrator.

Further in accordance with this aspect of the invention, advantage is taken of this common control principle to operate the pulse shifters in pairs. Again considering the foregoing example, speech signals from the calling line arrive at pulse shifter 421 in time slot $i=4$ and are delayed therein until time slot $j=12$ or a period of $j-i=8$ time slot duration. Similarly, speech signals from the called line arrive at pulse shitfer 420 in time slot $j=12$ and are delayed therein until time slot $i=4$ in the next frame F=24, or for a period of $[F-(j-i)]=16$ time slots duration. By judicious choice of the types of pulse shifters employed, as discussed hereinafter, a single control circuit will suffice for each pair of pulse shifters. The control information supplied to the common control circuit will be merely $[j-i]$ of each time slot in the frame.

Figure 5:
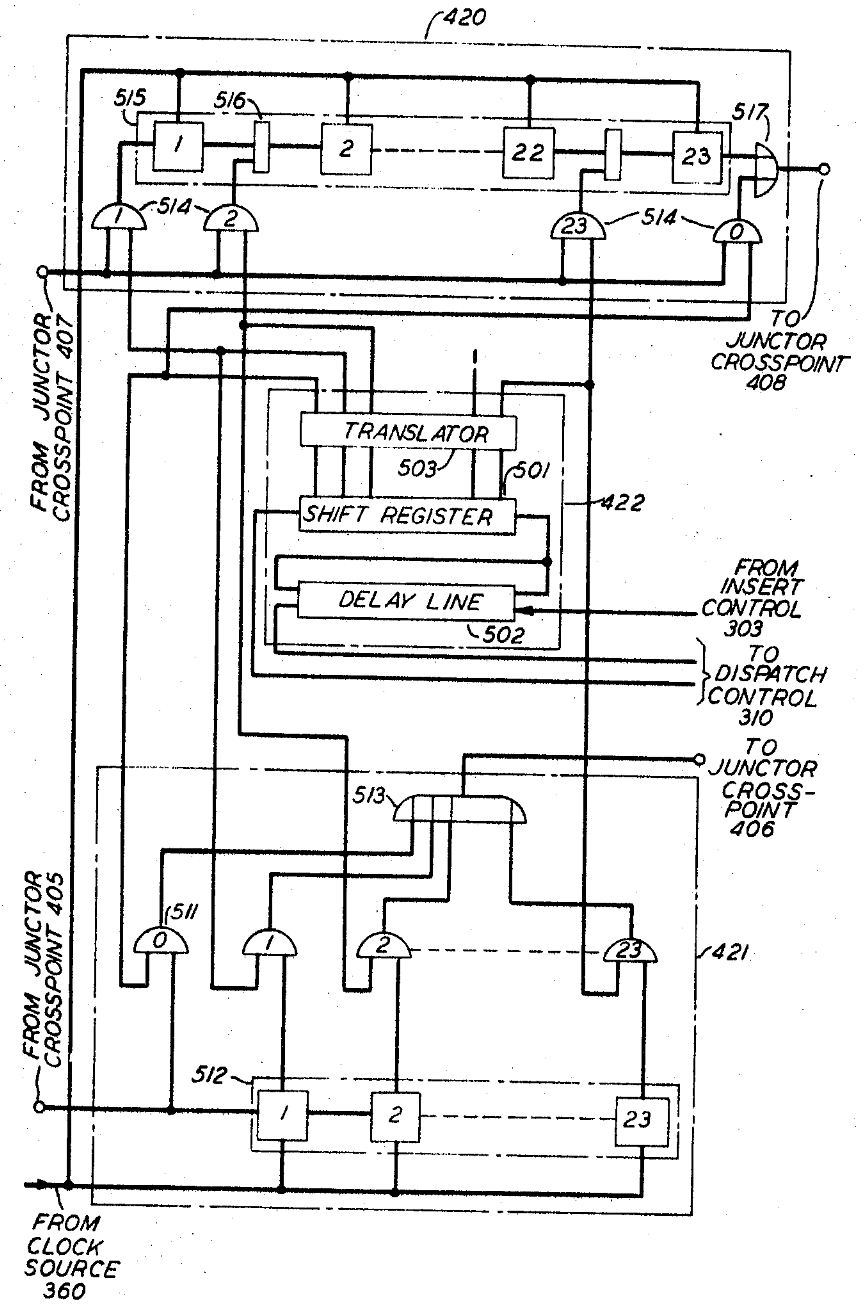
FIG. 5 is a schematic representation of the pulse shift portion of the network depicted in FIG. 4.

This arrangement is readily apparent from consideration of the particular pulse shifter and control circuits depicted in FIG. 5. Control circuit 422 corresponds to the junctor control circuit in that it comprises a circulating memory, in this instance shift register 501 and delay line 502, and a translator 503. The information supplied to the delay line 502 by insert control 303 is $j-i$ for each time slot. The particular $j-i$ value contained in shift register 501 in a given time slot is applied through translator 503 to the corresponding input AND gate 514 in pulse shifter 420 and to the corresponding output AND gate 511 in pulse shifter 421.

Looking first at pulse shifter 421, there is provided a register 512 having 23 stages connected in series and activated by clock source 360 in each time slot to shift the content of each stage to the succeeding stage. Input information from crosspoint 405 is applied to the first stage of the register 512 in the $i$ time slot and the outputs from each stage, together with the undelayed signal, are applied to the 24 output AND gates 511. In each time slot a particular one of the AND gates 511 designated by $j-i$ is then enabled to provide an output signal through OR gate 513 to the junior crosspoint 406 in the $j$ time slot after a delay in register 421 of $j-i$.

Pulse shifter 420 is arranged to receive input information in the $j$ time slot and to provide an output signal in the $i$ time slot. It comprises 24 input AND gates 514. Input AND gate 514–0 provides its output directly through OR gate 517 to junctor crosspoint 408, indicating a zero signal delay. The other 23 AND gates 514 direct their outputs to corresponding stages in shift register 515. This register corresponds to register 512 in pulse shifter 421, with the exception that the coupling circuit 516 is included between each pair of adjacent stages. This coupling circuit, the details of which are disclosed in the aforementioned Inose et al. patent application, directs the output of the AND gate 514 connected thereto to the succeeding stage of the shift register 515, irrespective of the signal provided by the preceding stage. The output of the shift register 515 is taken from the final stage 23 and applied through OR gate 517 to the junctor crosspoint 408. In this instance an input in the $j$ time slot is directed through the $j-i$ input AND gate 514 and, after the requisite delay of $[F-(J-i)]$ in shift register 515, is applied to junctor crosspoint 408 in the $i$ time slot.

The use of these complementary forms of pulse shifters permits each pair to be controlled by a single control circuit applying the $j-i$ signal to a corresponding AND gate in each of the pulse shifters. It is evident that such a circuit arrangement permits substantial economies through a reduction in the number of pulse shifter control circuits required in the system.

Another aspect of this invention is depicted in FIGS. 6 and 7 which illustrate the switching network connections required to complete interoffice calls. A three-stage time division network with pulse shifters connected within the junctor switches is depicted therein. We have found that this arrangement provides optimum results in both intraoffice and interoffice connections. Pulse shifters also may be included in the transmission channels for those systems in which sufficient control equipment is not available to permit a time slot reassignment at the concentrator.

The connection from a calling line to a called line is established through the send lead of the transmission channel of the originating concentrator, the associated pulse shifter, an input junctor gate, the junctor pulse shifter, the output junctor gate and the receive lead of the transmission channel connected to the concentrator terminating the called line. The connection for transmission in the opposite direction from the called line to the calling line is accomplished through a junctor which is paired with the junctor establishing transmission in the opposite direction. Thus the same time slot is utilized for the calling line in sending and receiving speech signals. Similarly, the called line employs a single time slot.

This arrangement is best illustrated by examples of intraoffice and interoffice calls. Considering, first, an intraoffice call, it will be assumed that a party in concentrator 101, FIG. 6, desires to call a party in concentrator 102.

Concentrator 101 will assign an idle time slot to the calling line, assumed in this instance to be time slot 4. The control equipment in control center 100 will attempt to establish a connection through the input junctor crosspoint network in the same time slot if, in fact, that time slot is commonly idle on the send lead of the transmission channel from concentrator 101 and a junctor path between any associated input junctor crosspoint and the corresponding pulse shifter. We will assume that in this instance time slot 4 is not commonly idle on both sides of any input junctor crosspoints associated with concentrator 101, and thus a different time slot must be determined which does satisfy this requirement. Let us consider that time slot 7 is available for this assignment at input junctor crosspoint 703, and similarly that time slot 10 is commonly idle at the output junctor crosspoint 706 leading to concentrator 102. The path from the calling line to the called line thus is as follows: a speech signal at concentrator 101 in time slot 7 is transmitted to pulse shift and junctor network 330 via the send lead of the corresponding transmission channel. Input junctor crosspoint 703 is enabled in time slot 7 so as to transfer the speech signal to pulse shifter 726 in that time slot. The pulse shifter 726 in turn is directed to shift the speech signal from time slot 7 to time slot 10, at which time output junctor crosspoint 706 is enabled to transfer the speech signal in time slot 10 to concentrator 102 and the called line.

Transmission in the opposite direction begins in time slot 10 at concentrator 102, the speech signals received from tht called line being transmitted in that time slot through input junctor crosspoint 704 to pulse shifter 723. This pulse shifter in turn is controlled to transfer the speech signal to time slot 7, whereupon output junctor crosspoint 705 is enabled to transfer the speech signal in that time slot to concentrator 101 and the calling line.

The controls for establishing this intraoffice connection correspond to those set forth in the discussion of FIG. 3. The control operation is straightforward in this instance, as in other time slot interchange arrangements, in that all of the formation essential to the completion of the connection is available to circuitry in the control center 100 of office A. Thus the assignment of input junctor crosspoint 703 to this call in time slot 7 presupposes the availability of output junctor crosspoint 705 in the same time slot, so that both the send and receive leads of the transmission channel connecting concentrator 101 to control center 100 are available to the calling line in time slot 7. Similarly, input junctor crosspoint 704 and output junctor crosspoint 706 are commonly available in time slot 10 so that both the send and receive leads of the transmission channel joining concentrator 102 to control center 100 are available to the called line in the same time slot. Since office A has all of the information available to it as to the status of each junctor crosspoint and pulse shifter involved in the establishment of this call, it is a simple matter to revise the time slot assignment of one or the other pair of junctor crosspoints if at the outset a common idle time slot is not indicated.

In accordance with this invention, operation of the input and output junctor crosspoints in pairs is most advantageous on interoffice calls where all of the necessary information to establish a connection is not immediately available to one office or the other. It is this paired arrangement of junctor crosspoints, together with the connection of the pulse shifters intermediate input and output junctor crosspoints, which provides an optimum network arrangement for interoffice connections in a time division switching system involving time slot interchange.

Let us consider, for example, that the calling party in concentrator 101 now desires to call a party terminating on concentrator 106 in office B. Let us assume that input junctor crosspoint 707 in network 330, FIG. 6, has its input from concentrator 101 and its output to pulse shifter 747 in network 330′ of office B, FIG. 7, commonly idle in time slot 7. This information can be determined from control information readily available in control center 100 of office A. Utilizing the principle of input and output junctor crosspoints operating in pairs, office A also assigns output junctor crosspoint 710, paired with input junctor crosspoint 707, for operation in time slot 7 so that pulse shifter 717 in office A will be connected to the receive lead of the transmission channel to concentrator 101 terminating the calling line in time slot 7.

Concurrent with the establishment of the information necessary to control the junctor crosspoints in office A, the called line designation is transmitted to office B via the data link 370 indicated in FIG. 3. Upon receipt of this information, equipment in control center 105, FIG. 7, will proceed to determine the idle or busy condition of the called line and, if idle, to determine common idle time slots through its junctor network 330′. We will assume in this instance that input junctor crosspoint 737 is available for assignment to this call in time slot 9. This presupposes, of course, that its companion output junctor crosspoint (in this instance 740) is also available in time slot 9. Having located such an idle pair of junctor crosspoints in office B, it is merely required that the two offices interchange the time slot assignments via the data link. Office B will then utilize the time slot 7 assignment information from office A to operate pulse shifter 747 in a manner which will permit information received in time slot 7 to be transmitted in time slot 9. Similarly, office A uses the time slot 9 designation from office B to control pulse shifter 717 so as to transpose information received in time slot 9 to time slot 7. Thus the control operations of the two offices are essentially independent, the only interaction being a notification of the time slot assignment. The search for a common idle time slot in each office proceeds independently, each office having sufficient information available to it for this purpose.

The complete connection, as outlined heretofore, thus is as follows: in time slot 7 from the calling line through concentrator 101, the send lead of the transmission channel, input junctor crosspoint 707 in office A to pulse shifter 747 in office B, and in time slot 9 through output junctor crosspoint 737 and the receive lead to concentrator 106 terminating the called line. Speech signals from the called line are transmitted in time slot 9 via the send lead of the transmission channel joining concentrator 106 to control center 105 and through input junctor crosspoint 740 to pulse shifter 717 in center 100 which transposes the information from time slot 9 to time slot 7, whereupon it is transmitted through output junctor crosspoint 710 and the receive lead of the transmission channel to concentrator 101 terminating the calling line.

The foregoing arrangement presupposes that time slot reassignment is possible at each concentrator. If such is not the case, additional pulse shifters may be included in the send and receive leads of each transmission channel connecting the concentrators to the corresponding offices. In this event the traffic-carrying capability corresponds to that in the system depicted in FIGS. 6 and 7.

An alternative arrangement, depicted in FIG. 8, has pulse shifters positioned in each send lead outside of the junctor network, with each of the output taps on a pulse shifter having access through a complete set of junctor crosspoints to each of the junctors. Also, pulse shifters positioned intermediate the input and output junctor crosspoints have access through each output tap to all receive leads through corresponding output junctor crosspoints. In this arrangement, as considered at length in the aforementioned Inose et al. application, speech signals in any slot on the send lead of a transmission channel may be connected through the junctor switch in any time slot and, similarly, the junctor switch may be connected in any time slot to the receive lead of the transmission channel. In this instance, therefore, time slot mismatch is overcome. We have found, however, that this arrangement is less attractive for interoffice connections than that depicted in FIGS. 6 and 7, primarily due to the simplicity and independence of control exercised in the latter arrangement, as well as the greater efficiency in junctor crosspoint operation. In the former arrangement one call involves two crosspoints, each of which is $n$ time division multiplexed, $n$ being the number of time slots, so that the efficiency of a crosspoint per time slot is at most $1/nM$, where M is the number of concentrators in the system; while in the latter arrangement the efficiency of a crosspoint per time slot is $3/n+2M$.

It is to be understood that the above-described arrangement is illustrative of the application of the principles of the invention. Numerous other arrangements may be devised by those skilled in the art without departing from the spirit and scope of the invention.

What is claimed is:

1. A communication system comprising a plurality of lines arranged in distinct groups, a plurality of concentrators each connected to a distinct group of said lines and comprising a time division switching network, a plurality of control centers each connected to a distinct group of said concentrators and comprising a junctor switching network, time multiplex trunks directly interconnecting the junctor switching networks in said control centers, means for enabling said time division switching networks to connect one line of a communicating pair of said lines to a first control center in a first time slot and to connect the other line of said pair of lines to a second control center in a second time slot, and means comprising the junctor switching network in each control center for transposing information received from said communicating pair of lines between said first and second time slots.

2. A communication system in accordance with claim 1, wherein said transposing means comprises distinct control means in each of said first and second control centers for establishing connections through the corresponding junctor switching network in predetermined time slots independent of the establishment of such connections in the other one of said first and second control centers.

3. A communication system in accordance with claim 2, and further comprising a data link interconnecting said first and second control centers and means for transmitting information between said control centers via said data link to inform each control center of the time slot assignments in the other control center.

4. A communication system in accordance with claim 1, wherein said junctor switching network comprises junctor crosspoints, pulse shifters and means connecting one of said pulse shifters between a junctor crosspoint in said first control center and a junctor crosspoint in said second control center.

5. A communication system in accordance with claim 4, and further comprising means responsive to the receipt in one control center of the assigned time slot in the other control center for activating said pulse shifter to provide an output signal in said assigned time slot.

6. A communication system in accordance with claim 4, wherein said junctor switching network comprises means for enabling said junctor crosspoints simultaneously in pairs.

7. A communication system in accordance with claim 1, wherein said junctor switching network comprises an input junctor crosspoint network, an output junctor crosspoint network, and means for simultaneously enabling a junctor crosspoint in each of said input and output junctor crosspoint networks.

8. A communication system is accordance with claim 7, wherein said junctor switching network further comprises a pair of pulse shifters each connected between a distinct crosspoint in the input junctor crosspoint network and a distinct crosspoint in the output junctor crosspoint network, and means comprising a single control source for enabling said pair of pulse shifters simultaneously with a common control signal.

9. A communication system in accordance with claim 8, wherein said pair of pulse shifters comprises logic circuitry arranged to provide complementary time slot delays in response to said common control signal, which delays result in the input signal of one pulse shifter and the output signal of the other pulse shifter appearing in the same time slot.

References Cited

UNITED STATES PATENTS 3,172,956 3/1965 Inose.
3,236,951 2/1966 Yamamto.

RALPH D. BLAKESLEE, Primary Examiner